US005654872A

United States Patent [19]
Sellers

[11] Patent Number: 5,654,872
[45] Date of Patent: *Aug. 5, 1997

[54] COLLAPSIBLE KEYBOARD STRUCTURE FOR A NOTEBOOK COMPUTER

[75] Inventor: Charles A. Sellers, Houston, Tex.

[73] Assignee: Compaq Computer Corporation, Houston, Tex.

[*] Notice: The term of this patent shall not extend beyond the expiration date of Pat. No. 5,532,904.

[21] Appl. No.: 633,009

[22] Filed: Apr. 16, 1996

Related U.S. Application Data

[63] Continuation of Ser. No. 268,818, Jun. 30, 1994, Pat. No. 5,532,904.

[51] Int. Cl.⁶ .............................. G06F 1/16; B41J 11/56; H05K 7/04; H01H 13/02
[52] U.S. Cl. .......................... 361/680; 400/490; 400/682; 200/344; 200/345
[58] Field of Search .......................... 364/708.1; 341/22; 400/479, 488, 490–492, 682; 200/5 A, 344, 345; 235/1 D, 145 R, 146; 361/680

[56] References Cited

U.S. PATENT DOCUMENTS 5,519,569 5/1996 Sellers ................................. 361/680
5,532,904 7/1996 Sellers ................................. 361/680

FOREIGN PATENT DOCUMENTS 5-19923 1/1993 Japan.

*Primary Examiner*—Michael W. Phillips
*Attorney, Agent, or Firm*—Konneker & Smith

[57] ABSTRACT

A notebook computer is provided with a collapsible keyboard structure in which, in response to closing of the computer housing lid, the key return spring portions of the keyboard are shifted away from their normal underlying relationships with the keys and the keys are forcibly retracted to a storage/transport orientation in which the overall thickness of the keyboard structure is reduced by an amount essentially equal to the stroke distance of the keys. When the lid is subsequently opened, the key return spring portions are shifted back to their normal underlying relationships with the keys, and the keys are forced outwardly by the return spring portions to their extended, operative orientations above the return spring portions.

20 Claims, 3 Drawing Sheets

COLLAPSIBLE KEYBOARD STRUCTURE FOR A NOTEBOOK COMPUTER

This is a continuation of application Ser. No. 08/268,818, filed Jun. 30, 1994, now U.S. Pat. No. 5,532,904.

BACKGROUND OF THE INVENTION

1. Field of the Invention

The present invention relates generally to computer apparatus, and more particularly relates to keyboard structures for portable computers such as notebook computers.

2. Description of Related Art

In recent years the notebook computer has made considerable gains in both popularity and technical sophistication. One factor contributing to the increasing popularity of the notebook computer is its ever decreasing size and weight, a factor arising from the ability to fabricate various components of the computer in smaller and smaller sizes while, in many cases, increasing the power and/or operating speed of such components.

One continuing challenge in the design of notebook computers, however, is the keyboard structure. This design challenge arises from two conflicting design goals—the desire to even further reduce the size of the keyboard structure, and the desirability of having the notebook computer emulate as closely as possible the size and typing "feel" of a desktop computer keyboard.

There are, of course, two dimensional factors which may be varied to reduce the size of a notebook computer keyboard structure—its horizontal dimensions (i.e., its length and width), and its vertical or thickness dimension. The horizontal dimensions of the keyboard are governed by the number, size, and relative spacing of the manually depressible key cap portions of the keyboard, and various reductions in these three dimensional factors may be utilized to reduce the overall length and/or width of the keyboard. However, as will be readily appreciated, a reduction in these three confiugurational aspects to gain a keyboard size reduction correspondingly lessens the similarity of the notebook computer keyboard in appearance, key arrangement and typing feel to its desktop counterpart.

Similar restraints are also presented when attempts are made to reduce the overall thickness of a notebook computer keyboard. One possibility which has been investigated and attempted is to simply reduce the keystroke distance in the notebook computer keyboard compared to its desktop counterpart. Using this design technique, the overall thickness of the notebook computer in its closed storage and transport orientation may be correspondingly reduced. However, this thickness reduction in the overall notebook computer, achieved by reducing the keyboard keystroke distance, creates what many users consider to be an undesirable typing "feel" difference compared to the longer keystroke distance typically found in a larger desktop computer keyboard.

As can be readily seen from the foregoing, it would be desirable to provide an improved notebook computer keyboard structure which permits a useful thickness reduction in the closed computer without a corresponding reduction in the operative keystroke distance of the keyboard structure. It is accordingly an object of the present invention to provide such an improved notebook computer keyboard structure.

SUMMARY OF THE INVENTION

In carrying out principles of the present invention, in accordance with a preferred embodiment thereof, a portable computer, representatively a notebook computer, is provided with a specially designed collapsible keyboard structure. The computer includes a base housing portion having a top side, and a lid housing portion secured to the base housing portion for pivotal movement relative thereto between a closed position in which the lid housing portion extends across and covers the top side, and an open position in which the lid housing portion uncovers and exposes the top side of the base housing portion.

The collapsible keyboard structure, in a preferred embodiment thereof, includes a key support structure anchored to the base housing and extending across its top side. A series of keys are carried on the top side of the key support structure for vertical movement relative thereto, through a key stroke distance, between upwardly extended operative positions and downwardly retracted nonoperative positions in which the overall vertical thickness of the keyboard structure is reduced by the key stroke distance. Preferably, the keys are secured to the key support structure by scissored linkage arm assemblies having central portions with mutually angled bearing and cam surfaces thereon.

A base structure, representatively a multi-layered signal pad structure with a spaced series of elastomeric key return dome members on its upper side, underlies the key support structure and is carried for horizontal movement relative to the key support structure between a first position in which the key return members underlie and upwardly engage the linkage assembly bearing surfaces and resiliently hold the keys in their upwardly extended operative positions, and a second position in which the key return members are horizontally offset from the bearing surfaces and permit the keys to move to their downwardly retracted nonoperative positions.

Preferably, first shifting means are provided for shifting the signal pad structure from its second position to its first position in response to opening of the lid housing portion, and second shifting means are provided for shifting the signal pad structure from its first position to its second position in response to closing of the lid housing portion. When the signal pad structure is shifted from its second position to its first position, the key return dome members engage the cam surfaces and extend the scissored linkage mechanisms to once again place the dome members in underlying engagement with the bearing surfaces of the linkage assemblies.

According to another feature of the invention, drive projections are formed on the top side of the signal pad structure and are operative, in response to the shifting of the signal pad structure from its first position to its second position, to engage and move portions of the scissored linkage arm assemblies in a manner forcibly collapsing the assemblies to positively drive the keys from their upwardly extended operative positions to their downwardly retracted nonoperative positions.

DETAILED DESCRIPTION

Figure 1:
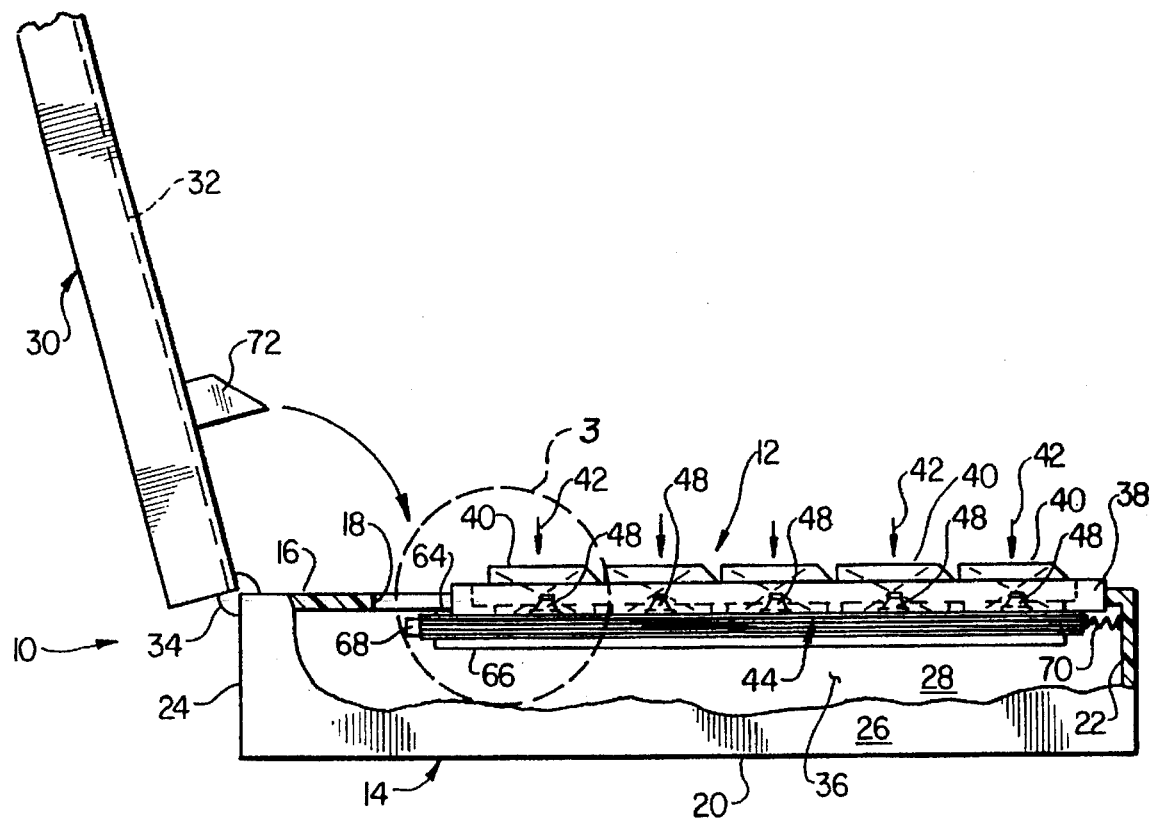
FIG. 1 is a partially sectioned, simplified side elevational view of a notebook computer having a collapsible keyboard structure embodying principles of the present invention, the computer being in an opened orientation and the keyboard structure being in its key-extended use configuration.
Figure 2:
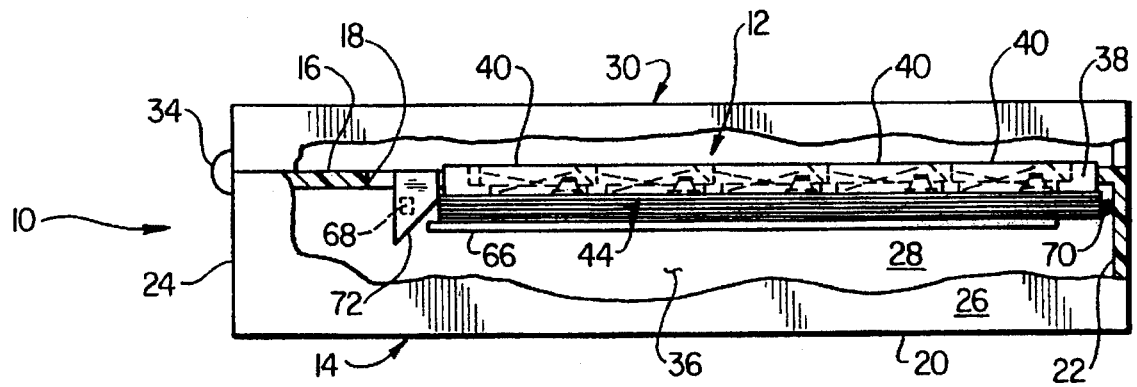
FIG. 2 is a view similar to that in FIG. 1, but with the computer in its closed orientation and the keyboard structure being in its key-retracted storage/transport orientation.

Referring initially to FIGS. 1 and 2, the present invention provides a portable computer, illustratively a notebook computer 10, having incorporated therein a specially designed collapsible keyboard structure 12 embodying principles of the present invention. Computer 10 includes a hollow rectangular base housing 14 having a top horizontal side wall 16 with an opening 18 therein; a bottom horizontal side wall 20; front and rear vertical end walls 22,24; and a pair of opposite vertical side walls 26,28.

A hollow rectangular lid housing 30, having a display screen 32 on its front or inner side, is pivotally secured along a hinge joint 34 to a top rear corner portion of the base housing 14. Lid housing 30 may upwardly pivoted to place the computer 10 in an open use orientation (FIG. 1) in which the top side 16 of the base housing 14 is exposed and the display screen 32 forwardly faces the user of the computer, or downwardly pivoted to place the computer 10 in a closed storage and transport orientation (FIG. 2) in which the lid housing extends across and covers the top side of the base housing 14. Suitable latch means (not shown) are provided to releasably retain the lid housing 30 in its FIG. 2 closed orientation.

The collapsible keyboard structure 12 extends across the opening 18 in the top side wall 16 of the base housing 14 and occupies only a relatively small upper portion of the interior 36 of the base housing. Referring now to FIGS. 1, 2 and 4, the keyboard structure basically comprises a relatively thin rectangular monoblock support structure 38 that horizontally extends across the base housing top side opening 18 and is suitably anchored to the base housing 14; a series of manually depressible key cap members 40 carried for vertical movement relative to the support structure 38 (as indicated by the arrows 42 in FIG. 1) through a keystroke distance D (see FIG. 3A); and a rectangularly configured, multilayer signal pad structure 44 that underlies the support structure 38 and is transverse to the keystroke directions 42.

The signal pad structure 44, which is of a generally conventional construction, is shown in simplified exploded form in FIG. 4 and includes, from top to bottom, (1) a plastic dome sheet 46 having a spaced series of rubber key return domes 48 projecting upwardly from its top side; (2) a plastic top circuit sheet 50 having a spaced series of circular, electrically conductive pads 52 disposed on its bottom side, aligned with the domes 48, and connected to surface trace circuitry (not shown) formed on the sheet 50; (3) a plastic spacer sheet 54 having a spaced series of circular openings 56 formed therein and underlying the pads 52; (4) a plastic bottom circuit sheet 58 having a spaced series of circular, electrically conductive pads 60 disposed on its top side, aligned with the sheet openings 56, and connected to surface trace circuitry (not shown) formed on the sheet 58; and (5) a metal backing sheet 62.

The five sheet members 46,50,54,58,62 are suitably held in their indicated stacked orientation to combinatively define the overall signal pad structure 44. As illustrated in FIGS. 1–3B, the signal pad structure 44 has opposite side edge portions that are slidably retained between two sets of horizontal rail member pairs 64,66 formed on the interior sides of the base housing side walls 26 and 28. For purposes later described, the rail member pairs 64,66 support the signal pad structure 44 for horizontal front-to-rear movement relative to the base housing 14, and thus relative to the keyboard support structure 38, between a first position (FIGS. 1 and 3A) in which the left or rear side edge of the signal pad structure 44 abuts a pair of stop projections 68 formed on the inner sides of the base housing side walls 26 and 28, and a second position (FIGS. 2 and 3B) in which the signal pad structure 44 is forwardly shifted away from the stop projections 68.

With the computer lid housing 30 in its FIG. 1 open position, a plurality of schematically depicted compression spring members 70, interposed between the right or front edge of the signal pad structure 44 and the front base housing end wall 22, resiliently hold the signal pad structure 44 in its first position. However, as the lid housing 30 is subsequently closed, a spaced pair of tapered cam projections 72 disposed on the front or inner side of the lid housing 30 engage the rear side edge of the signal pad structure 44 and drive it to its second position (FIG. 2) against the resilient resistance force of the spring members 70. When the lid housing 30 is opened again, the cam projections 72 are lifted out of engagement with the signal pad structure 44 to thereby permit the spring members 70 to drive the signal pad structure 44 back to its FIG. 1 first position.

According to an important aspect of the present invention, in a manner subsequently described herein this selective shifting of the signal pad structure 44 relative to the keyboard support structure 38 is operative to automatically shift the key cap members 40 between a FIG. 3A extended operating orientation (when the signal pad structure 44 is in its leftwardly shifted first position), and a FIG. 3B retracted position (when the signal pad structure 44 is in its rightwardly shifted second position).

Turning now to FIGS. 3A, 3B, 5A and 5B, each of the key cap members 40 has a hollow, rectangular molded plastic body with a top side wall 74 with a downwardly and forwardly sloping front edge portion 76, and an open bottom side 78. A scissored linkage assembly 80 is secured to the bottom of each of the key cap members 40 and includes a first pair of scissor arms 82 and a second pair of scissor arms 84, with longitudinally intermediate portions of the arms 82 being pivotally connected to longitudinally intermediate portions of the arms 84 as indicated.

First ends of the arms 82 are joined by a cylindrical rod 86 pivotally anchored in tabs 88 projecting downwardly from the top key member wall 74, while the opposite ends of the arms 82 have outwardly projecting cylindrical pins 90 formed thereon and slidingly received in a slot 92 formed in the bottom side of the support structure 38. First ends of the arms 84 are joined by a cylindrical rod 94 having its opposite ends pivotally anchored in tabs 96 on the bottom side of the support structure 38, while the opposite ends of the arms 84 have outwardly projecting cylindrical pins 98 slidingly received in slots 100 formed on the underside of the key cap member 40.

Longitudinally intermediate portions of the scissor arms 84 are interconnected by a joining plate structure 102 having, on its underside, a bottom bearing surface 104, and a forwardly facing cam surface 106 extending at an angle to the bearing surface 104. The scissored linkage assembly 80 is movable relative to its associated key cap member 40 between an extended position shown in FIGS. 3A and 5A, and a retracted position shown in FIGS. 3B and 5B.

Figure 3A:
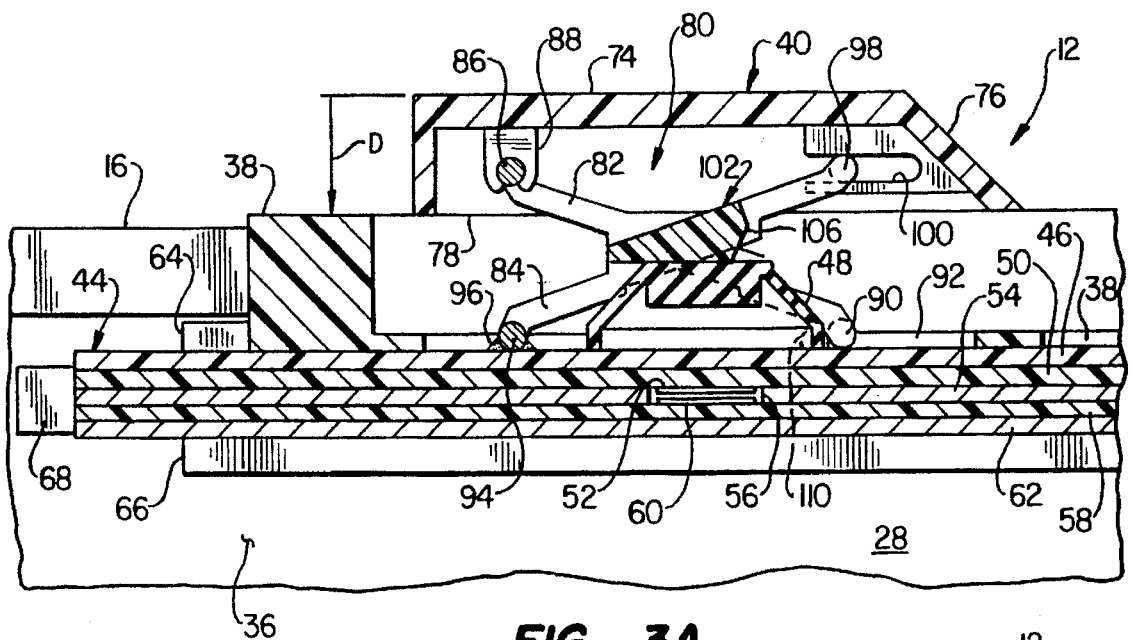
FIGS. 3A and 3B are enlarged scale cross-sectional detail views of the circled area "3" in FIG. 1 with the keyboard key cap members respectively in their extended use positions and their retracted storage/transport positions.
Figure 3B:
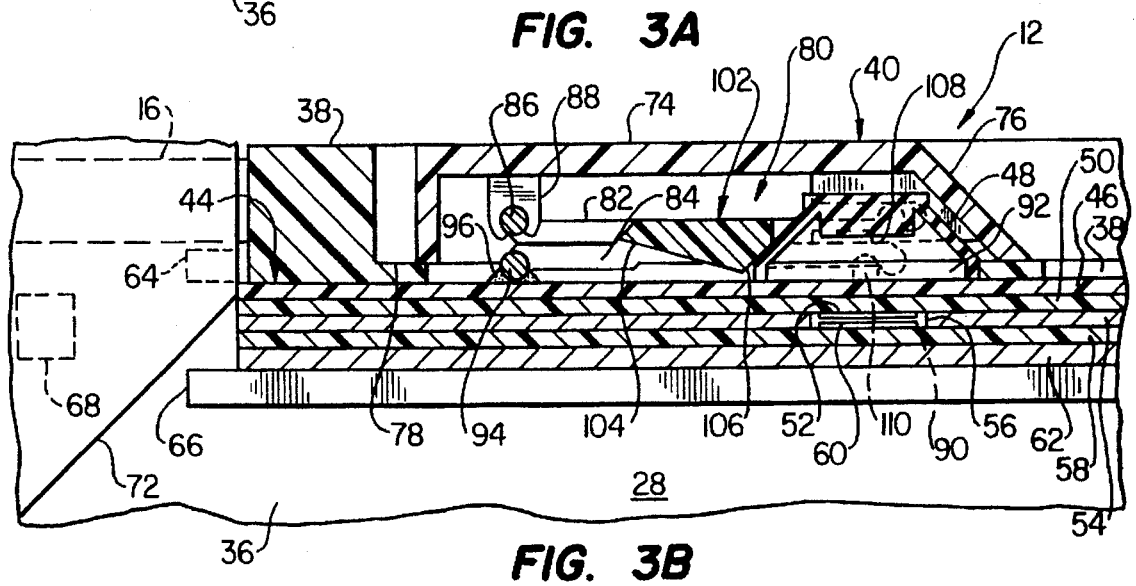
Figure 4:
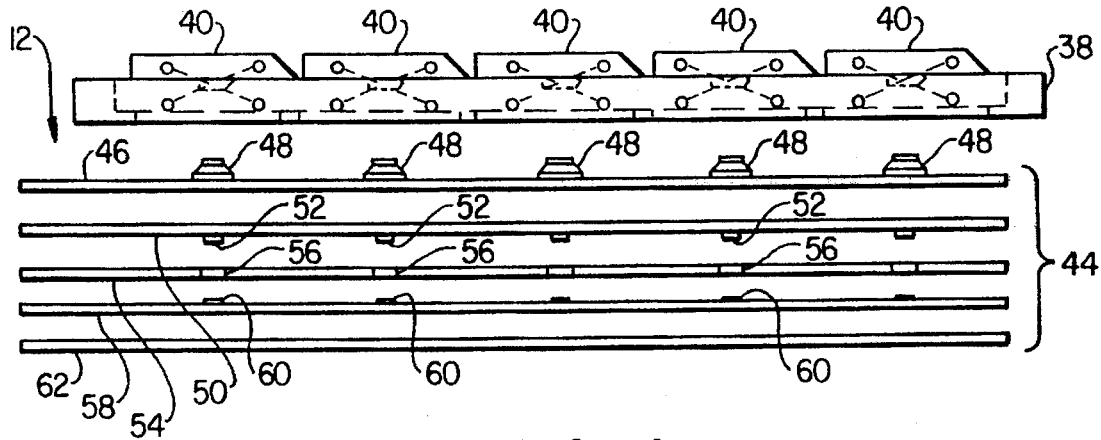
FIG. 4 is a highly schematic exploded side elevational view of the keyboard structure.
Figure 5A:
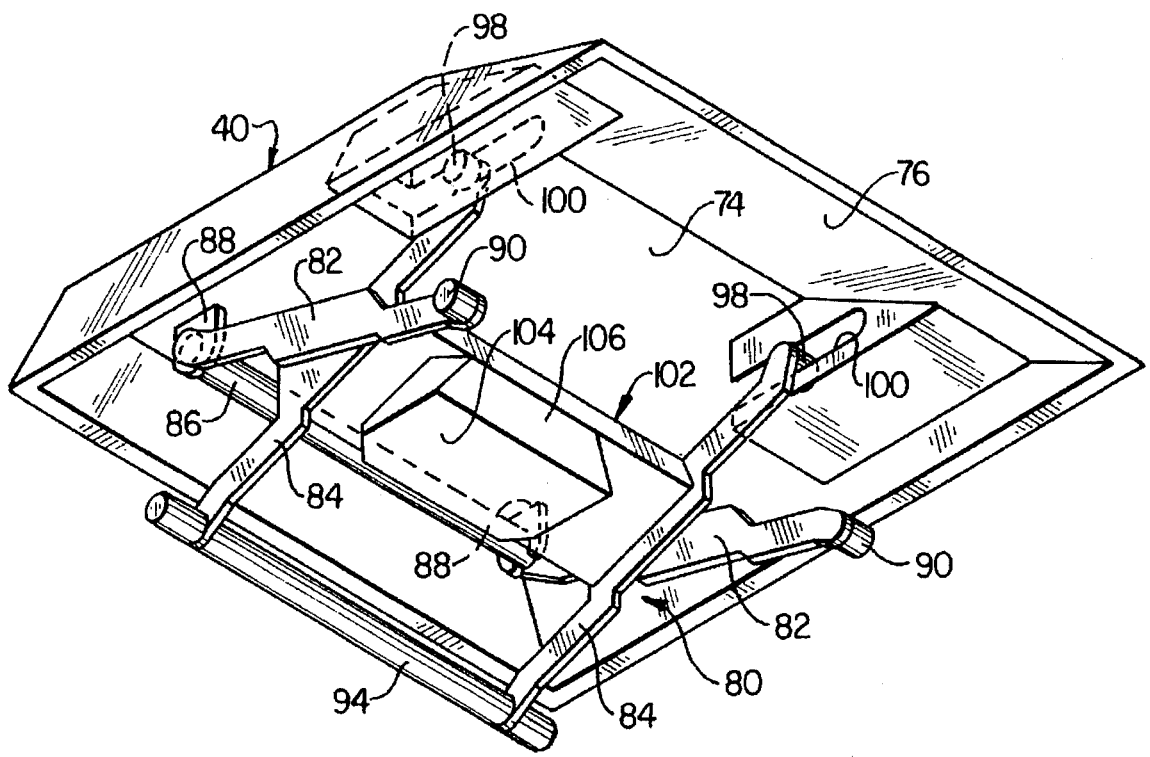
FIGS. 5A and 5B are enlarged scale bottom side perspective views of a key cap member respectively illustrating a scissored support portion thereof in its extended and retracted position.
Figure 5B:
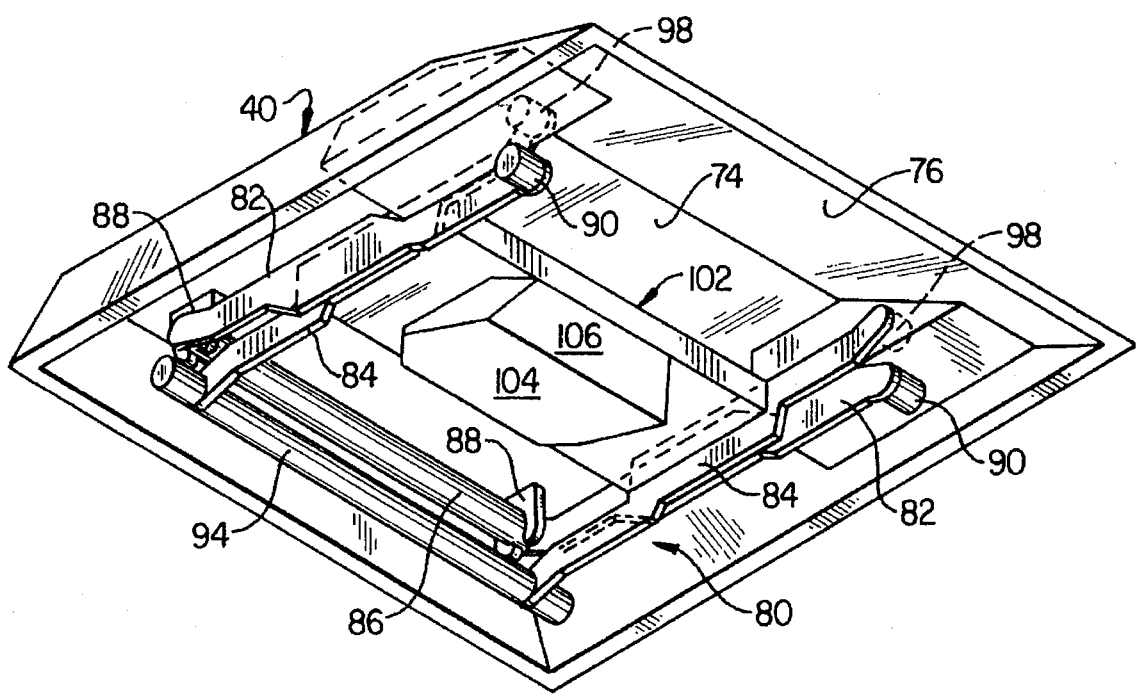

Referring now to FIGS. 3A and 3B, with the lid housing 30 opened, the signal pad structure 44 is driven to its FIG. 3A position (by the spring members 70 shown in FIG. 1), and the key cap members 40 are in their FIG. 3 operatively extended positions in which the scissored linkage assemblies 80 are in their extended positions, with the bearing surfaces 104 of the linkage assemblies 80 overlying and downwardly engaging the upper ends of the resilient key return domes 48.

When any of the key cap members 40 is manually depressed, against the resilient resistance of its associated return dome 48, the dome is downwardly deformed to cause an internal projection 108 therein to be downwardly pressed against a portion of the dome sheet 46 underlying the projection 108. This, in turn, causes the contact pad pair 52,60 underlying the projection 108 to be brought into engagement with one another and cause their associated circuitry to output an electrical signal indicative of the striking of their associated key cap member. When the key cap member is released from its manually depressed orientation, it is automatically returned upwardly to its FIG. 3A position by the resilient force of its underlying key return dome 48 which functions as a return spring means.

When the signal pad structure 44 is forwardly shifted from its FIG. 3A position to its FIG. 3B position, in response to closing the lid housing 30 as previously described, the key return domes 48 are forwardly moved out from under their associated scissor linkage bearing surfaces 104, and the scissored linkage assemblies 80 are forcibly driven to their retracted FIG. 3B positions. This, in turn, downwardly drives the key cap members 40 to their FIG. 3B retracted positions, thereby reducing the overall thickness of the collapsible keyboard structure 12 by the keystroke distance D.

The forcible retraction of the key cap members 40 is effected by a spaced series of upward projections 110 formed on the top side of the dome sheet 46. Pairs of the projections 110 are positioned on opposite sides of the domes 48 and located immediately behind the opposite ends of the scissor arm pins 90. When the signal pad structure 44 is rightwardly driven away from its FIG. 3A position the projections 110 rightwardly engage and drive the pins 90 to thereby forcibly move the scissored linkage assemblies 80 from their FIG. 3A extended positions to their retracted FIG. 3B positions. Alternatively, the projections 110 could be omitted and the key cap members 40 permitted to fall by gravity to their retracted FIG. 3B positions when the signal pad structure 44 is rightwardly driven from its FIG. 3A position to its FIG. 3B position.

When the lid housing 30 is opened again, the resulting leftward or rearward driven movement of the signal pad structure 44 causes the sloping rear side surfaces of the key return domes 48 to rearwardly engage the forwardly and upwardly sloped cam surfaces 106 of the linkage assemblies 80 in a manner forcing the linkage assemblies 80 back to their FIG. 3A extended positions in which the upper ends of the domes 48 underlie and engage the linkage assembly bearing surfaces 104 to thereby return the key cap members 40 to their upwardly extended operative positions.

From the foregoing it can be seen that the collapsible keyboard structure 12 of the present invention effectively reduces the thickness of the keyboard structure in its FIG. 3B storage/transport orientation by the key stroke distance D, and automatically brings the keyboard structure to this orientation in response to the closure of the lid housing 30. Accordingly, the key stroke distance D does not have to be undesirably reduced (compared to the corresponding key stroke distance of a desktop computer keyboard) to reduce the storage/transport thickness of the keyboard structure 12.

While the keyboard structure 12 has been representatively depicted as having the keyboard support structure 38 fixedly secured to the base housing 14, with the signal pad structure 44 being shiftable relative to the support structure 38, it will be appreciated that, alternatively, the keyboard support structure 38 could be shifted relative to the signal pad structure 44 if desired.

Additionally, while the key structures 40 have been representatively illustrated as being supported on the keyboard carrying structure 38 using scissored linkage assemblies, other means of supporting the key cap members 40 for vertical movement could be utilized if desired. Moreover, spring return means other than the rubber key return domes 48 could be provided for forward and rearward shifting relative to the key cap members if desired.

The foregoing detailed description is to be clearly understood as being given by way of illustration and example only, the spirit and scope of the present invention being limited solely by the appended claims.

What is claimed is:

1. A method of operating a keyboard having a series of keys each supported for movement, in a first direction through a keystroke distance, between extended and retracted positions, and resilient means for underlying and contacting said keys and resiliently supporting them in said extended positions thereof, said method comprising the step of:

creating a first relative shift between said keys and said resilient means, transversely to said first direction, in a manner permitting said keys to be moved from said extended positions thereof to said retracted positions thereof without compressing said resilient means.

2. The method of claim 1 further comprising the steps of:

operatively mounting the keyboard in the base portion of a portable computer having a lid portion attached thereto, and causing the closing of said lid portion to create said first relative shift.

3. The method of claim 1 wherein:

said resilient means include a spaced series of elastomeric key return dome members, and said step of creating a first relative shift is performed in a manner relatively shifting said elastomeric key return dome members, and said keys transversely to said first direction to shift said dome members out of underlying supporting relationship with said keys.

4. The method of claim 1 further comprising the step of:

forcibly moving said keys from said extended positions thereof to said retracted positions thereof in response to the creation of said first relative shift.

5. The method of claim 4 further comprising the steps of:

creating a second relative shift between said keys and said resilient means, transversely to said first direction, and utilizing said second relative shift to return said keys to said extended positions thereof, with said resilient means underlying and resiliently supporting said keys.

6. The method of claim 5 further comprising the steps of:

operatively mounting the keyboard in the base portion of a portable computer having a lid portion attached thereto, and causing the opening of said lid portion to create said second relative shift.

7. The method of claim 1 wherein said step of creating a first relative shift is performed by shifting said resilient means relative to said keys.

8. Keyboard apparatus comprising:

a series of keys;

support means for supporting said keys for movement, in a first direction through a keystroke distance, between extended and retracted positions; and depressible key return means for underlying and resiliently holding said keys in said extended positions thereof, one of said support means and said depressible key return means being shiftable relative to the other of said support means and said depressible key return means, transversely to said first direction, in a manner permitting said keys to be moved from said extended positions thereof to said retracted positions thereof without depressing said depressible key return means.

9. The keyboard apparatus of claim 8 wherein said depressible key return means include a series of elastomeric key return dome members.

10. The keyboard apparatus of claim 8 wherein said depressible key return means are shiftable, transversely to said first direction, relative to said keys.

11. The keyboard apparatus of claim 8 further comprising:

means for forcing said keys from said extended positions thereof to said retracted positions thereof in response to shifting one of said series of keys and said depressible key return means relative to the other of said series of keys and said depressible key return means transversely to said first direction.

12. The keyboard apparatus of claim 8 further comprising:

means for forcing said keys from said retracted positions thereof to said extended positions thereof, in response to shifting one of said series of keys and said depressible key return means relative to the other of said series of keys and said depressible key return means transversely to said first direction.

13. A method of constructing a keyboard comprising the steps of:

providing first and second support means which are shiftable relative to one another in opposite directions;

mounting a series of keys on said first support means for movement relative thereto, in a keystroke direction generally transverse to said opposite directions, between extended and retracted positions;

mounting a series of resilient key return members on said second support means in a manner causing said resilient key return members to be selectively (1) disposed in a first position beneath said keys in engagement therewith and resiliently supporting them in said extended positions thereof, or (2) offset from said keys to a second position in a manner permitting said keys to be moved to said retracted positions thereof without deforming said resilient key return members, in response to a relative shifting of said first and second support means in said opposite directions.

14. A keyboard constructed by the method of claim 13.

15. The method of claim 13 further comprising the step of:

configuring said resilient key return members to engage said keys, and drive them from said retracted positions thereof to said extended positions thereof, in response to a relative shifting of said keys and said resilient key return members in a manner moving said resilient key return members from said second position thereof to said first position thereof.

16. A keyboard constructed by the method of claim 15.

17. The method of claim 13 further comprising the step of:

linking said keys and said second support means in a manner such that said keys are driven from said extended positions thereof to said retracted positions thereof in response to a relative shifting of said first and second support means in a manner moving said resilient key return members from said first position thereof to said second position thereof.

18. A keyboard constructed by the method of claim 17.

19. The method of claim 13 wherein said step of mounting a series of resilient key return members is performed by mounting a spaced series of elastomeric key return dome members on said second support means.

20. A keyboard constructed by the method of claim 19.

* * * * *